United States Patent
Runde et al.

(10) Patent No.: US 7,559,876 B2
(45) Date of Patent: Jul. 14, 2009

(54) METHOD OF DETECTING AND PREVENTING TIE-UP DURING A DOUBLE TRANSITION UP-SHIFT

(75) Inventors: Jeffrey K. Runde, Fishers, IN (US); Scott E. Mundy, Carmel, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 381 days.

(21) Appl. No.: 11/619,204

(22) Filed: Jan. 3, 2007

(65) Prior Publication Data

US 2008/0161159 A1    Jul. 3, 2008

(51) Int. Cl.
*F16H 61/16* (2006.01)
(52) U.S. Cl. ...................................... 477/125
(58) Field of Classification Search ................. 477/125, 477/133, 136, 141
See application file for complete search history.

(56) References Cited

U.S. PATENT DOCUMENTS

| | | | |
|---|---|---|---|
| 4,989,477 A * | 2/1991 | Hunter et al. ............... 477/148 |
| 5,014,573 A | 5/1991 | Hunter et al. |
| 5,038,636 A * | 8/1991 | Vukovich et al. ........... 477/148 |
| 5,848,951 A * | 12/1998 | Lee ............................. 477/133 |
| 5,995,896 A * | 11/1999 | Depping et al. ................ 701/51 |
| 6,761,664 B2 * | 7/2004 | Ayabe et al. ................. 477/144 |

* cited by examiner

*Primary Examiner*—Ha D. Ho

(57) ABSTRACT

A method of detecting and preventing tie-up during a double transition shift of an automatically shiftable transmission operatively connected with an engine is provided. The method includes. A) shifting the automatically shiftable transmission from an initial speed ratio to an intermediate speed ratio; B) commanding the automatically shiftable transmission to shift from the intermediate speed ratio to a final speed ratio; D) determining if the automatically shiftable transmission has been operating in the intermediate speed ratio for greater than a predetermined amount of time after commanding the automatically shiftable transmission to shift from the intermediate speed ratio to the final speed ratio; and E) preventing shifting from the intermediate speed ratio to the final speed ratio to avoid tie-up if it is determined that the automatically shiftable transmission has been operating in the intermediate speed ratio for greater than a predetermined amount of time.

17 Claims, 17 Drawing Sheets

| RANGE | C1 | C2 | C3 | C4 | C5 | C6 |
|---|---|---|---|---|---|---|
| LO |   |   | X |   |   | X |
| 1 | X |   |   |   | X |   |
| 2 | X |   |   | X |   |   |
| 3 | X |   | X |   |   |   |
| 4 | X | X |   |   |   |   |
| 5 |   | X | X |   |   |   |
| 6 |   | X |   | X |   |   |
| R |   |   | X |   | X |   |

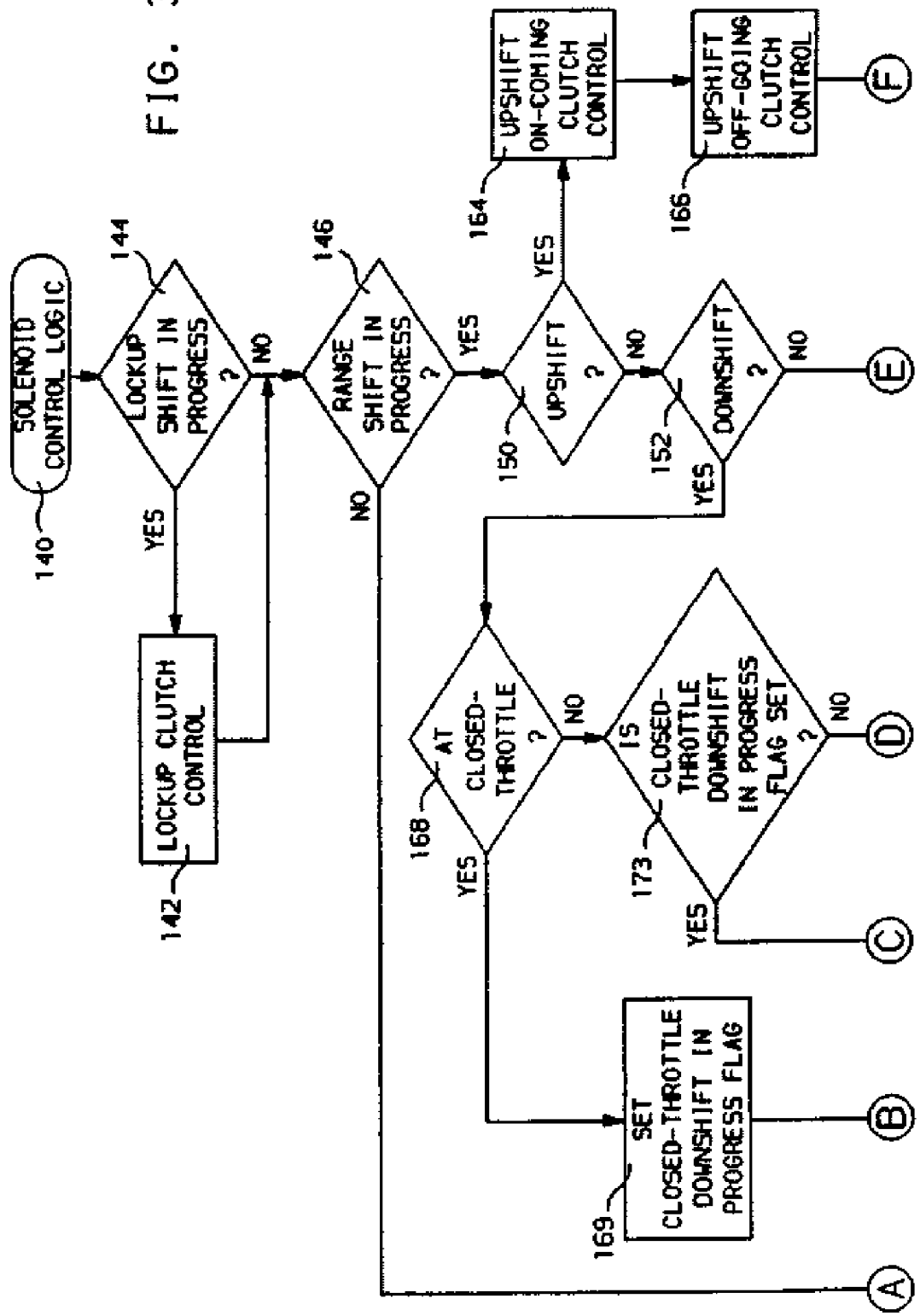

US 7,559,876 B2

METHOD OF DETECTING AND PREVENTING TIE-UP DURING A DOUBLE TRANSITION UP-SHIFT

TECHNICAL FIELD

This invention relates to a method of controlling a shift in an automatic transmission, and more particularly, to a method of detecting and preventing tie-up during a double transition up-shift.

BACKGROUND OF THE INVENTION

Generally, a vehicular automatically shiftable transmission includes a number of gear elements coupling its input and output shafts, and a number of torque establishing devices, such as clutches and brakes, which are selectively engageable to activate certain gear elements for establishing a desired speed ratio between the input and output shafts. The brake can be of the band type or disk type; those skilled in the automotive art refer to disc type brakes in transmissions as "clutches" or "reaction clutches". As used herein, the terms "clutches" and "torque transmitting devices" will be used to refer to brakes as well as clutches.

The input shaft is typically connected to the vehicle's engine through a fluid coupling, such as a torque converter, and the output shaft is operatively connected to the vehicle's wheels. The shifting from one forward speed ratio to another is undertaken in response to engine load, such as throttle opening, and vehicle speed. This shifting generally involves releasing or disengaging a clutch (off-going) associated with the current speed ratio and applying or engaging a clutch (on-coming) associated with the desired speed ratio. In this disclosure, a double transition is featured, wherein two clutches associated with the current speed ratio are released and two other clutches associated with the desired speed ratio are engaged.

The speed ratio is defined as the transmission input speed or turbine speed divided by the output speed; thus, a low gear range has a high speed ratio and a higher rear range has a lower speed ratio. To perform an up-shift, a shift is made from a high speed ratio to a low speed ratio. In the type of transmission involved in this invention, the up-shift from low range to first range is accomplished by disengaging two clutches associated with the higher speed ratio and engaging two clutches associated with the lower, or target, speed ratio to thereby reconfigure the gear set to operate at the lower speed ratio. Shifting performed in the above manner require precise timing in order to achieve high quality shift feel. In the case of double transition shifts, particular care must be taken to avoid clutch tie-up or a momentary shift to neutral during the range shift, and instead to provide power throughout the shift.

SUMMARY OF THE INVENTION

A method of detecting and preventing tie-up during a double transition shift of an automatically shiftable transmission is provided. The automatically shiftable transmission includes an input shaft operatively connected with an engine and an output shaft. The method includes the steps of: A) shifting from an initial speed ratio to an intermediate speed ratio by disengaging a first selectively engageable off-going torque transmitting mechanism and subsequently engaging a first selectively engageable on-coming torque transmitting mechanism; B) determining whether a relative speed of the input shaft to the output shaft has obtained a predetermined relationship; C) commanding the automatically shiftable transmission to shift from the intermediate speed ratio to a final speed ratio by commanding disengagement of a second selectively engageable off-going torque transmitting mechanism and subsequently commanding engagement of a second selectively engageable on-coming torque transmitting mechanism if the relative speed of the input shaft to the output shaft has obtained the predetermined relationship; D) determining if the automatically shiftable transmission has been operating in the intermediate speed ratio for greater than a predetermined amount of time and if engine load is greater than a predetermined value prior to commanding engagement of the second selectively engageable on-coming torque transmitting mechanism; and E) preventing shifting from the intermediate speed ratio to the final speed ratio to avoid tie-up by preventing engagement of the second selectively engageable on-coming torque transmitting mechanism if it is determined that the automatically shiftable transmission has been operating in the intermediate speed ratio for greater than the predetermined amount of time and the engine load is greater than the predetermined value. In the preferred embodiment, the intermediate speed ratio is lower than the final speed ratio and wherein the final speed ratio is lower than the initial speed ratio.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1*b* is a diagram or truth table illustrating the clutch engagements required to establish the various speed ratios of the transmission depicted in FIG. 1*a*;

FIGS. 2, 3*a*, and 3*b* are flow diagrams representative of computer program instructions executed by the computer-based controller of FIG. 1*a* in performing the shift control of the transmission;

DESCRIPTION OF THE PREFERRED EMBODIMENTS

Figure 1A:
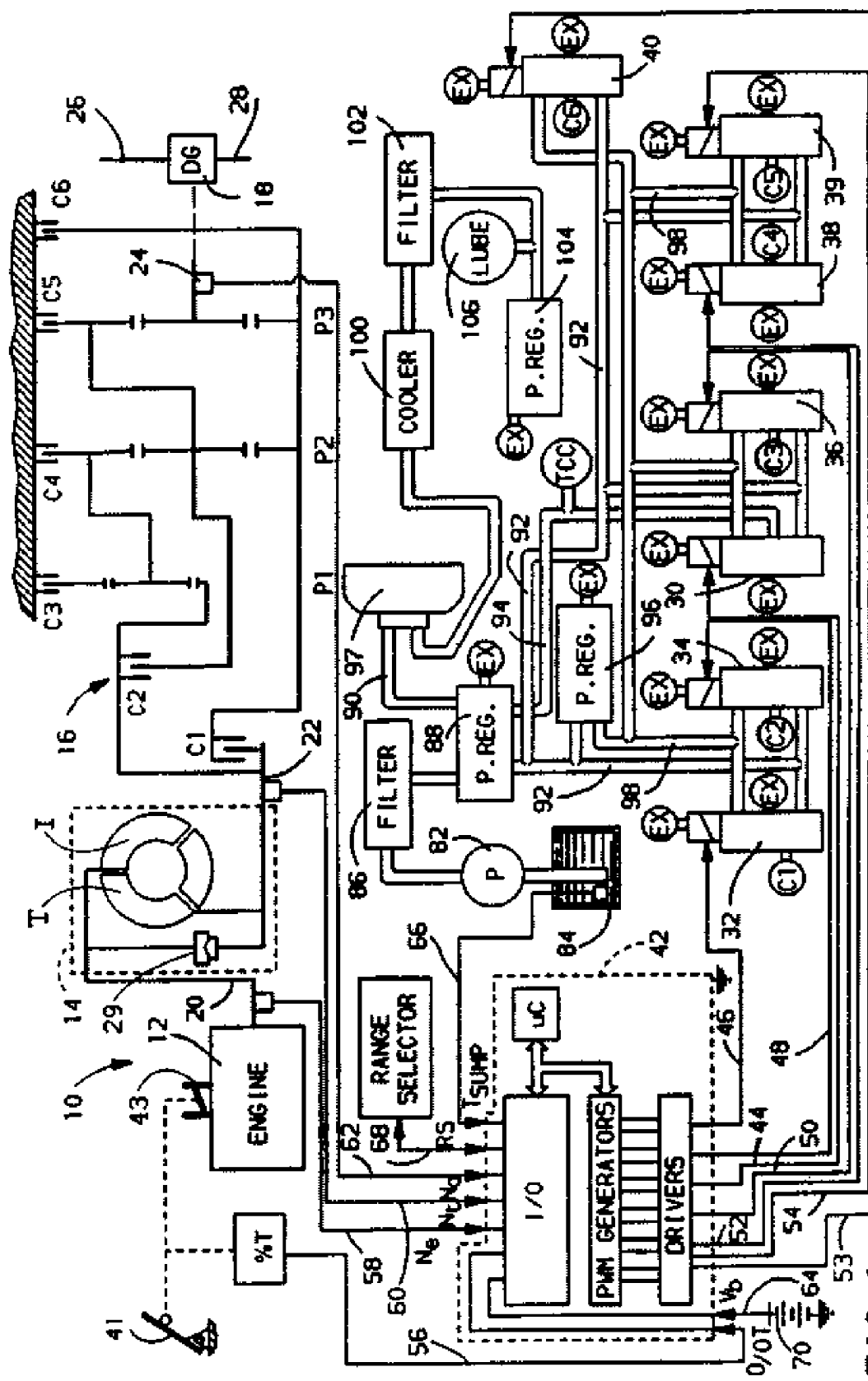
FIG. 1*a* is a system diagram of a fluid operated vehicular automatically shiftable transmission, including several solenoid operated fluid pressure control valves and a computer-based control unit for carrying out the control strategy.

Referring now to the drawings, and more particularly to FIG. 1a, the reference numeral 10 generally designates a motor vehicle drive train or powertrain including a throttled internal combustion engine 12, a fluidic torque converter 14, a seven-speed fluid operated power transmission 16 and a differential gear set (DG) 18. The engine 12 is connected to the torque converter 14 via shaft 20, the torque converter 14 is connected to the transmission 16 via shaft 22, the transmission 16 is connected to the differential gear set 18 via shaft 24 and the differential gear set 18 is connected to a pair of drive wheels (not shown) via the shafts 26 and 28. The transmission 16 includes a plurality of planetary gear sets P1, P2, and P3.

Shifting of the transmission 16 is accomplished by selectively engaging and disengaging brakes and clutches, herein called torque transmitting devices or clutches C1, C2, C3, C4, C5, and C6. The clutches C1, C2, C3, C4, C5, and C6 are actuated by hydraulic pressure and upon engagement, require a fill time before torque is transmitted between a driving and a driven friction element within the clutch.

Figures 1B, 2:
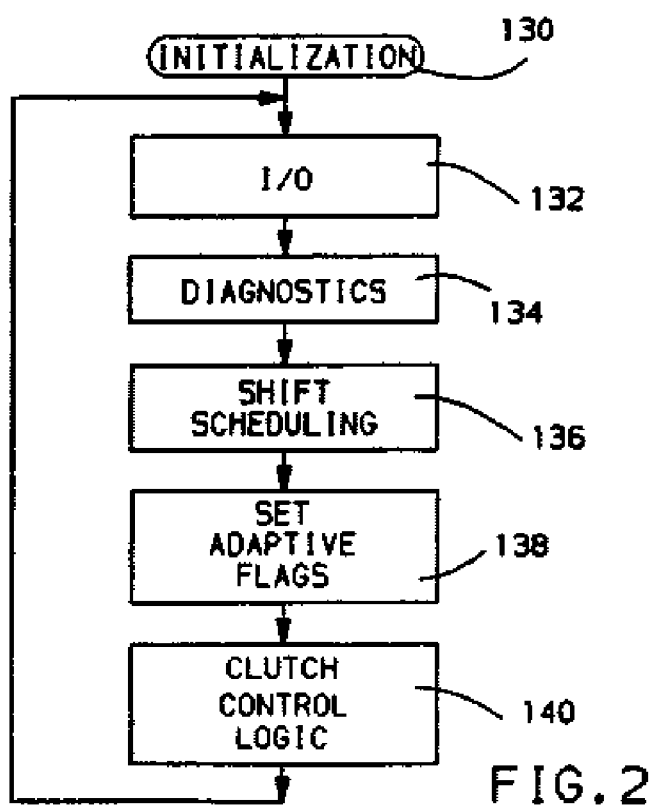

The speed and torque relationships between the engine 12 and the drive wheels of the vehicle are controlled by a fluid operated torque converter clutch, or TCC 29, and the six fluid operated transmission clutches C1, C2, C3, C4, C5, and C6. The TCC 29 is selectively engaged to mechanically connect the impeller I and turbine T of torque converter 14. The TCC 29 and clutches C1, C2, C3, C4, C5, and C6 are selectively engaged and disengaged by a respective solenoid operated control valve 30, 32, 34, 36, 38, 39, and 40, in accordance with the diagram of FIG. 1b, to selectively establish a desired transmission speed ratio. The diagram of FIG. 1b illustrates that to up-shift from Low to first range, clutches C3 and C6 are released and clutches C1 and C5 are engaged in a double transition up-shift scenario. The transmission gear configuration of FIG. 1a provides one reverse ratio and seven forward ratios. An operator manipulated accelerator pedal 41 positions the engine throttle 43 for selectively and variably controlling the power output of the internal combustion engine 12. Those skilled in the art will recognize alternate methods of controlling power for different engine architectures, such as by controlling fueling for a non-throttled diesel engine.

The operation of the solenoid operated control valves 30, 32, 34, 36, 38, 39, and 40 is controlled by a computer-based control unit 42 via lines 44, 46, 48, 50, 52, 53, and 54 in response to various input signals representative of system parameters. Such inputs include an engine throttle position signal % T on line 56, an engine output shaft speed signal Ne on line 58, a torque converter output shaft speed signal Nt on line 60, a transmission output shaft speed signal No on line 62, a system supply voltage signal Vb on line 64, a transmission fluid temperature signal Tsump on line 66 and an operator range selector position signal RS on line 68. The system voltage is supplied by the battery 70, and the input signals are obtained with devices known in the art, such as potentiometers, thermistors, and magnetic speed pickups.

Internally, the control unit 42 comprises a number of devices including a microcomputer (uC) with internal clock and memory, an input/output device (I/O) and an array of pulse width modulation (PWM) generators and drivers. A PWM generator and a driver are dedicated to each solenoid control valve 30, 32, 34, 36, 38, 39, and 40. The PWM outputs are delivered to the respective drivers and are used to energize the respective solenoid control valves 30, 32, 34, 36, 38, 39, and 40. The duty cycle of the PWM outputs determine the hydraulic pressure supplied by the solenoid control valves 30, 32, 34, 36, 38, 39, and 40, with a low percent duty cycle yielding a low pressure and a high percent duty cycle yielding a high pressure for a normally closed valve.

The hydraulic circuit of transmission 16 includes a positive displacement pump 82 for supplying pressurized hydraulic fluid from the sump or reservoir 84, to the clutches TCC 29 and C1. C2, C3 C4, C5, and C6 through various hydraulic and electro-hydraulic valving mechanisms. After passing through a main circuit filter 86, the fluid output of pump 82 is directed to a main pressure regulator valve 88 which develops regulated fluid pressures in lines 90 and 92.

The fluid in line 90, generally referred to as converter feed pressure, is directed through the torque converter 14, as schematically designated by the converter shell 97. After passing through a cooler 100 and cooler filter 102, the converter fluid is then regulated down to a lower pressure by the regulator valve 104 and directed to the transmission lube circuit 106.

The fluid in line 92, generally referred to as main or line pressure, is supplied as an input to the solenoid control valves 30, 32, 34, 36, 38, 39, and 40, and also to a control pressure regulator valve 96. The control pressure regulator valve 96 develops a somewhat lower pressure in line 98, referred to herein as the control pressure, such pressure being directed to the solenoid of each control valve 30, 32, 34, 36, 38, 39, and 40.

The fluid in line 94, referred to as the converter clutch pressure, is supplied directly by solenoid 30 to the torque converter clutch TCC 29 to effect engagement. This pressure is also supplied to the main regulator valve 88 to provide a lower regulated line pressure in the converter lock-up mode.

FIGS. 2, 3a, 3b, and 6 through 16 are flow diagrams representative of computer program instructions executed by the computer-based control unit 42 of FIG. 1a in carrying out the shift control technique of this invention. FIG. 2 represents an executive or main loop program which directs the sequential execution of various subroutines. Block 130 designates a series of instructions executed at the initiation of each period of vehicle operation for setting or initializing the various timers, registers, and variable values of control unit 42 to predetermined initial values. Thereafter, blocks 132, 134, 136, 138, and 140 are sequentially and repeatedly executed as indicated by the flow diagram lines. Block 132 reads the various input signal values and outputs the required control signals to the PWM generators and drivers for solenoid controlled valves 30, 32, 34, 36, 38, 39, and 40. Blocks 134, 136, and 138 contain diagnostic, shift scheduling, and adaptive flag logic, respectively. The clutch control logic contained in block 140 analyzes the various system input signals described above in reference to FIG. 1a, develops pressure command signals PCMD for application to the solenoid operated control valves at the next execution of block 132, and computes adaptive corrections based on the adaptive flags at shift completion. Block 140 also effects pulse width modulation of the solenoid drive voltage to carry out the pressure commands for specific shift operations. Block 140 is detailed in the flow chart of FIGS. 3a and 3b.

Figure 3B:
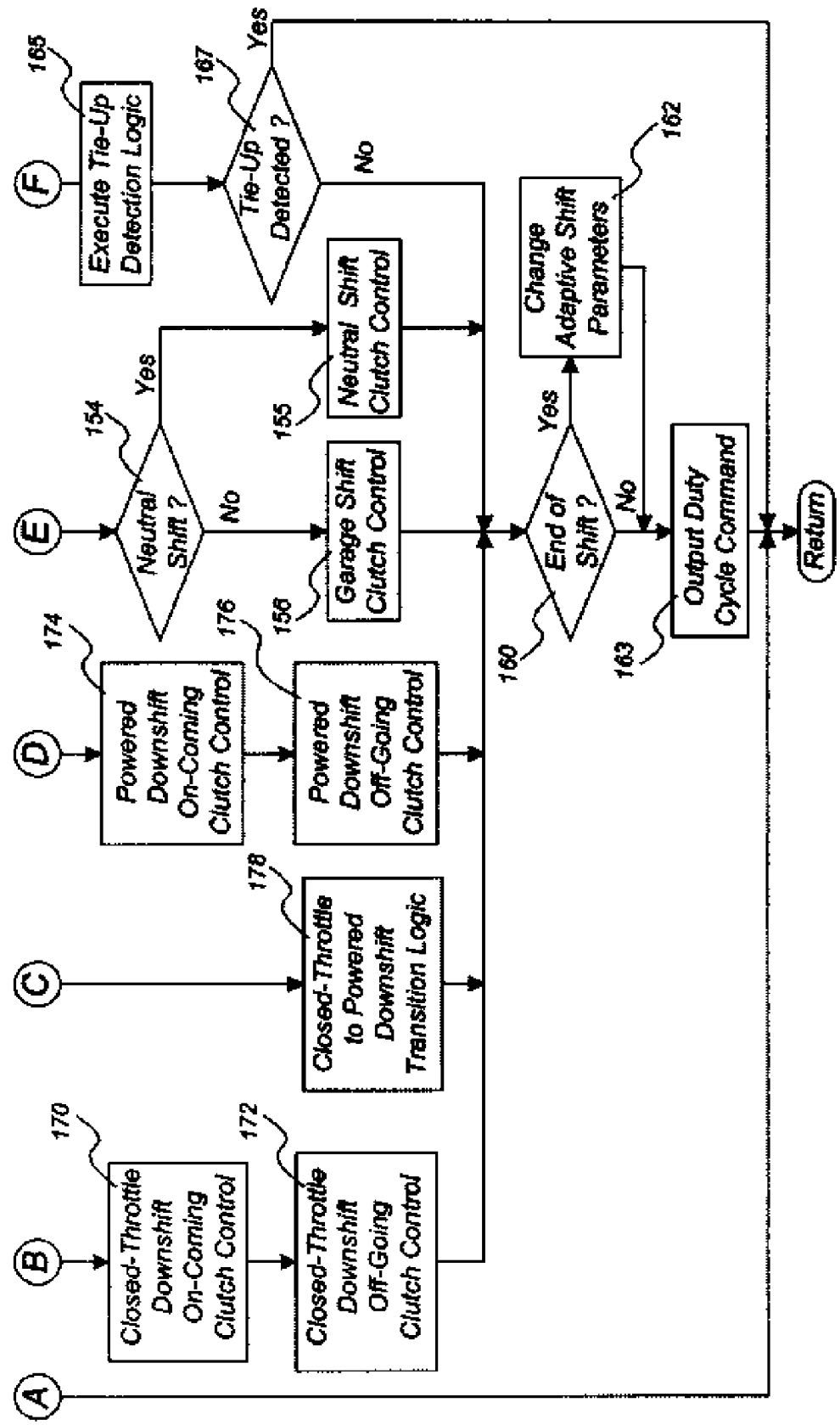

The flow diagram of FIGS. 3a and 3b, taken together, sets forth the program for making decisions as to the type of range shift in progress, if any, and determines the specific control for the on-coming and the off-going clutches. The program also checks whether a shift has performed within specifications, and if not, certain shift parameters are changed at shift completion according to predefined adaptive logic to correct the shift. First, lockup clutch control is executed at block 142 if, at block 144, it is determined that a lockup shift is in progress. Subsequently, at block 146, it is determined (from the shift schedule) whether a range shift is in progress. If not, the clutch control logic is exited. If a range shift is in progress, it is determined whether it is an up shift (see block 150), a downshift (see block 152), a neutral shift (see block 154), or a garage shift (see block 156). A garage shift is a shift from neutral to either drive or reverse, or a shift from drive to reverse or from reverse to drive. The control flows from either the up-shift, downshift, neutral shift, or the garage shift block to the end-of-shift test at block 160. Once it has been determined that the shift is complete at block 160, adaptive shift parameters are changed if required at block 162 and the duty cycle command is output at block 163. If, at block 160, it is determined that the shift has not ended, the duty cycle command is output at block 163 before returning to the main loop of FIG. 2.

Figure 16:
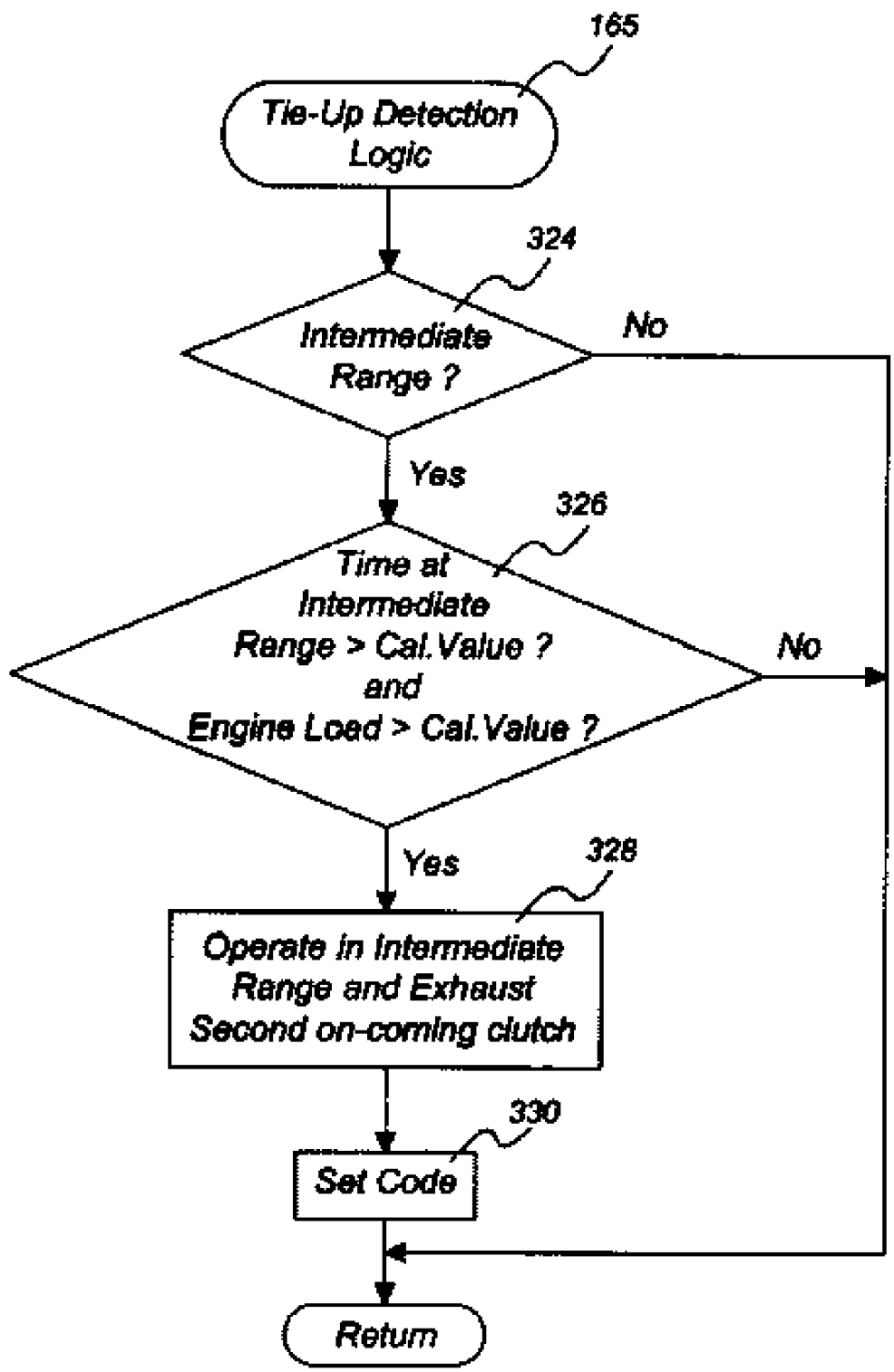
FIG. 16 is a flow diagram for detecting and preventing tie-up during the double transition shifting, detailed in FIG. 4, graphs A, B, C, D, and E, in accordance with the present invention.

If an up-shift is indicated at block 150, the up-shift oncoming clutch control (block 164) and the up-shift off-going clutch control (block 166) are activated. A tie-up detection routine, discussed in greater detail in FIG. 16, is executed at block 165 if the up-shift is a double transition up-shift such as when shifting from Low to the first forward range. At block 167 a determination is made as to whether a tie-up condition is detected, and is so the routine exits to the main loop of FIG. 2. If a downshift is indicated at block 152, it is next determined whether it is a closed throttle downshift or a powered downshift at block 168. If it is a closed throttle downshift a closed throttle in progress flag is set at block 169, the closed throttle on-going clutch control is activated at block 170 and the closed throttle off-going clutch control is activated at block 172. If it is determined at block 168 that the downshift is not at closed throttle, the closed throttle flag is checked at block 173. If the flag is not set, the powered downshift oncoming clutch control (block 174) and the powered downshift off-going clutch control (block 176) are activated. If the closed throttle flag is set at block 173 and the throttle opened during the course of the closed throttle downshift, a transition to powered downshift may be necessary: in such case, the appropriate transition logic is invoked at block 178. If the shift is a neutral shift as determined at block 154, the neutral shift clutch control executes shifts from drive to neutral or from reverse to neutral at block 155.

Each control phase operates by setting pressures, pressure increments, times or other values to predefined calibrated values which are herein generally called "set", "preset", "given", or "certain" values. Each such value is chosen from a table of calibrated values for each specific transmission condition, throttle range, and shift type. Thus, different values are supplied for upshift, downshift, etc. as well as each range shift, e.g., 1-2, 2-1, 4-3, 5-4, etc. Converter and lockup modes may also require separate sets of calibration values.

Figure 4:
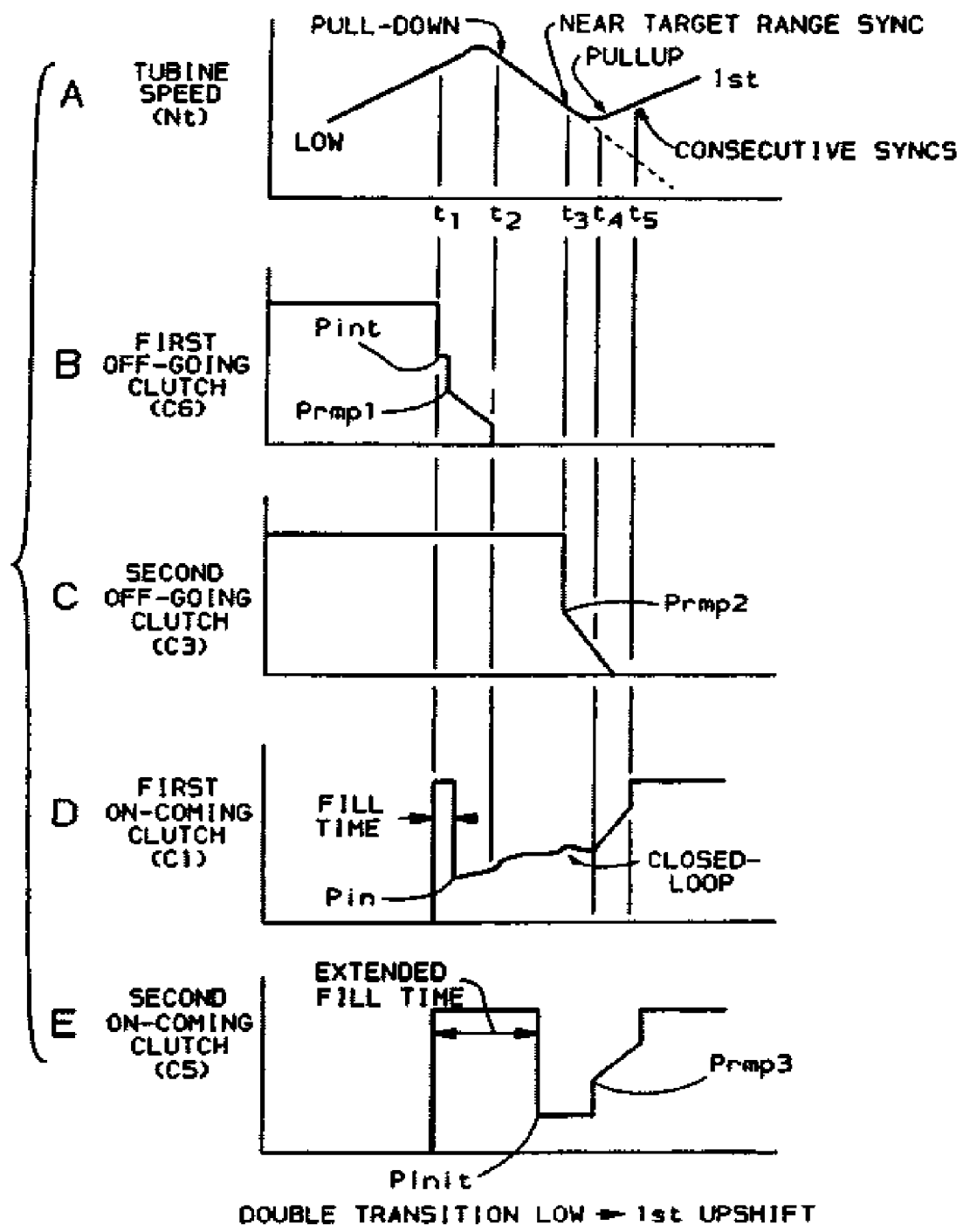
FIG. 4, graphs A, B, C, D, and E, illustrate turbine speed, first and second off-going pressure commands, and first and second on-coming pressure commands, respectively, for double transition shifting in accordance with the present invention.

FIG. 4, graphs A, B, C, D, and E, detail the controlled clutch pressures for a double transition up-shift from Low to the first forward range, as well as the turbine speed or input speed. Graph A is a graph of turbine speed versus time, graph B illustrates the commanded pressure versus time for the first off-going clutch C6, graph C illustrates the commanded pressure versus time for the second off-going clutch C3, graph D illustrates the commanded pressure versus time for the first on-coming clutch C1, and graph E illustrates the commanded pressure versus time for the second on-coming clutch C5. The curve in graph A is typical for the case of increasing vehicle speed prior to shift initiation at time t1, and indicates the turbine speed Nt during the low range, the speed decrease during shifting, and increase again at a lower level after shifting to the first forward range. The reduction of the turbine speed Nt is due to the slowing action of the on-coming clutch, causing slip of the off-going clutch, and is indicative of "turbine pull-down". Turbine pull-down is detected at time t2 by sensing when the turbine speed Nt falls a set amount below the product of the output speed No and the first range speed ratio SR1. The speed after shifting (after time t5) is "synchronous speed"; i.e., the turbine speed Nt equals the output speed No times the first range speed ratio SR1, or Nt=(No*SR1). The time t3 when the turbine speed is near synchronous speed is determined by Nt<(No*SR1)+K1, where SR1 is the speed ratio of first range and K1 is a constant. The time t4 marks the turbine pull-up and is defined as Nt>Ntmin+K2, where Ntmin is the minimum value of turbine speed recorded during the time following the detection of a near sync condition and K2 is a constant. The time t5 is the end of the shift as determined by synchronous speed being detected in a set number of consecutive computer control loops.

Referring to graphs B, D, and E, it can be observed that initially, at the time t1 of the shift command, the pressure commands for the on-coming clutches C1 and C5 are set to the maximum pressure value to begin filling the clutch cavities. The pressure command of the off-going clutch C6 is initially reduced to an intermediate value, Pint, for a brief time, and is then reduced to an initial value Prmp1, and is then ramped down until off-going clutch slip (or turbine pull-down) is detected (time t2), and then dropped to zero. The brief period at the intermediate value, Pint, is effective to reduce clutch pressure undershoot caused by solenoid dynamics. For the first on-coming clutch, C1, graph D illustrates that maximum pressure is commanded for a fill time. The fill time allows nearly complete stroking of the clutch plates and obtains clutch torque capacity. Subsequently, the command pressure drops to an initial value, Pin, and ramps up slowly until it causes turbine pull-down at time t2. The combination of the on-coming upward ramp and the off-going downward ramp results in a torque transition from the first off-going clutch, C6, to the first on-coming clutch, C1. The pressure command of the second on-coming clutch, C5, as shown in graph E, enters an extended fill time at t1 and then drops to a standby initial pressure, Pinit, until pull-up is detected at time t4. Thus, from time t2 through t4, clutches C1 and C3 are engaged, at least in part, to satisfy the FIG. 1*b* condition for the third forward range. By attaining an intermediate forward range, such as the third forward range, power may be delivered by the transmission during the shift. Additionally, the intermediate forward range enables the turbine speed to be pulled down to a synchronous speed for first range.

Figure 5:
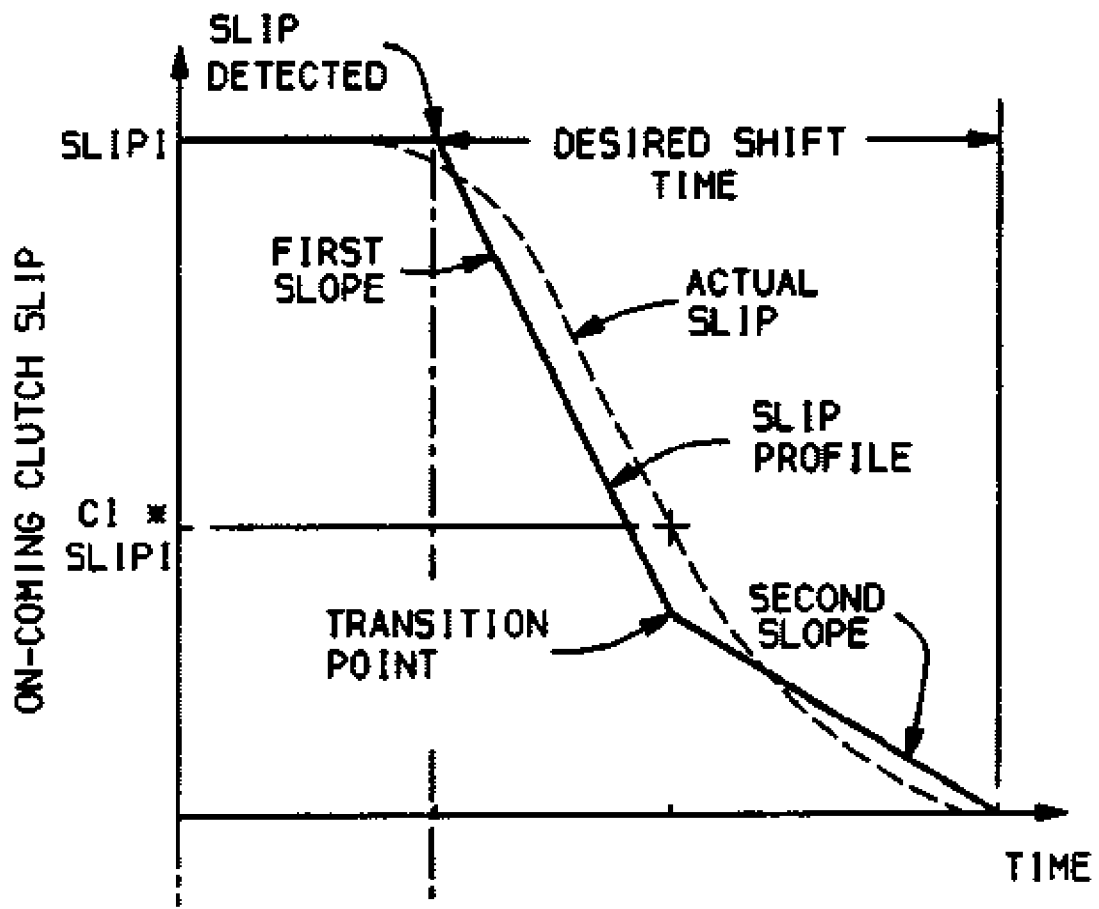
FIG. 5 is a slip diagram for the closed-loop operation of an on-coming clutch in accordance with the present invention.

At time t2 the first off-going clutch C6 is commanded to zero pressure and the first on-coming clutch C1 enters a closed-loop control period, wherein the pressure is adjusted to maintain the on-coming clutch C1 slip close to a calculated slip profile as described below in reference to FIG. 5. When the turbine speed, Nt, reaches near synchronous speed at time t3, the pressure command on the second off-going clutch C3 is dropped to a beginning value Prmp2, whereafter it is ramped to zero pressure. The closed-loop control of on-coming clutch C1 continues until off-going clutch C3 releases at time t4 to cause turbine speed pull-up. At that point, the pressure command for on-coming clutch C1 is ramped up to complete its engagement. Should the second off-going clutch C3 fail to disengage a tie-up condition will occur within the transmission 16. A method of detecting the tie-up condition is discussed hereinbelow with reference to FIG. 16. At the same time, the pressure command for on-coming clutch C5 is stepped up to an initial engagement pressure Prmp3, and then ramped up to complete engagement. Maximum pressure is applied to both on-coming clutches to end the shift when synchronization is detected for several consecutive times at t5.

The double transition up-shift process has several features which contribute to smooth and efficient operation. Power is transferred to the output during the process of turbine speed pull-down. Furthermore, events such as pull-down, pull-up, and target range synchronization are used to control clutch application and release, thereby providing controlled timing of the clutches. The on-coming and off-going pressure ramp commands reduce clutch timing sensitivity to the initial pressure commands. Thus, variations in clutches due to temperature or other factors do not impose critical demands on the timing of torque transition because the ramps can continue for a variable time, subject to a limit value. Also, the immediate release of the first off-going clutch following pull-down detection reduces clutch tie-up which might result in a braking action. The closed-loop control of the on-coming clutch reduces shift variation and the end-of-shift torque disturbance.

The closed-loop control is better explained with reference to FIG. 5 which illustrates the on-coming slip speed profile in solid lines and actual slip speed in dashed lines. Slip speed is determined by comparing the turbine speed to the output speed. Specifically, slip speed is the absolute difference (times a conversion factor K3) between turbine speed and the product of the output speed and the speed ratio of the target range or SLIP=K3*ABS[Nt−(No*SR1)]. Thus, as soon as a shift command is issued, there is a slip speed across the on-coming clutch. The initial slip speed, SLIPI, is the slip speed value at the detection of turbine pull-down. The slip speed profile begins at that point and decreases at a fixed rate, called the first slope. At a determined point, the rate reduces to a second slope. The first and second slopes are chosen so that, ideally, the actual slip speed can be made to smoothly reach zero within a given time period. The second slope is less steep than the first slope, and reduces end of shift torque disturbance by more closely matching the acceleration rates on both sides of the first on-coming clutch. By using on-coming clutch slip speed as the control target, both turbine and output speeds are considered when controlling the shift duration.

To determine the slopes of the slip profile, three constants K4, K5 and K6 are defined. The constant K4 is a fraction of SLIPI at which the second slope begins; i.e., if SLIP is less than or equal to K4*SLIPI, the slope changes to the second slope. The constant K5 is the desired time to utilize the first slope. The constant K6 is the desired overall closed-loop time. The constants K5 and K6 are used only for the slope calculation and not for direct timing purposes. The first and second slopes SLOPE1, SLOPE2 are defined as: SLOPE1= [SLIPI−(K4*SLIPI)]/K5; and SLOPE2=K4*SLIPI(K6−K5).

The arrival at synchronization speed is determined by making several measurements in consecutive control loops. This assures that true synchronization has been achieved and maintained. If synchronization is assured, full clutch pressure is immediately applied.

Figure 6:
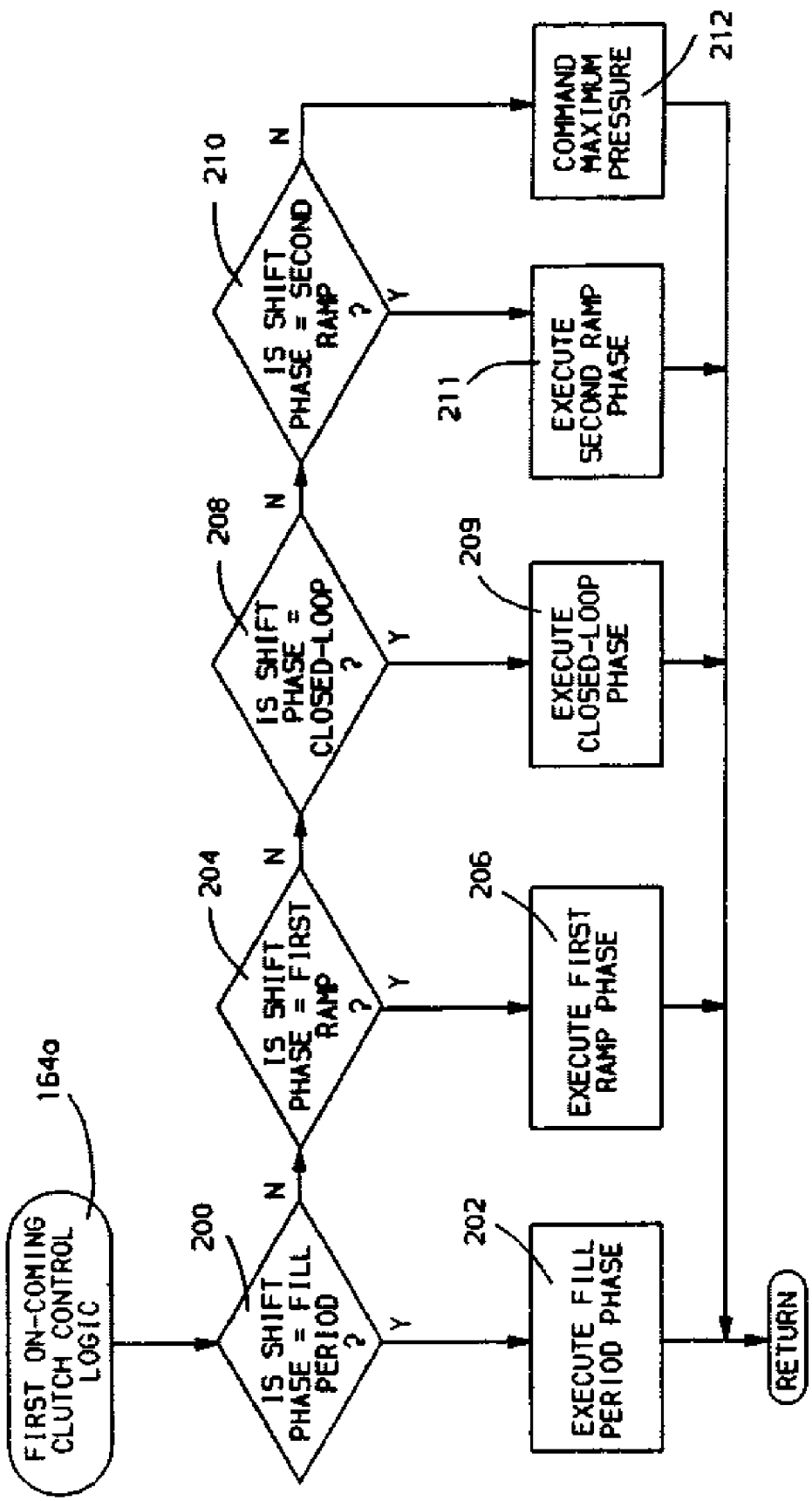
FIGS. 6, 7, 8, and 9 are flow diagrams for the first on-coming clutch control logic, in accordance with the present invention.

The flow charts of FIGS. 6-15 illustrate the control logic incorporated in the program for shift control. In these flow charts, SHIFT PHASE is a pointer for indicating the stage of shift process for each clutch. In FIG. 3, the block 164 effects the on-coming clutch control for both on-coming clutches C1 and C5. FIG. 6 illustrates the logic flow for the first on-coming clutch control, and is designated 164a. If SHIFT PHASE is FILL PERIOD at block 200, the Fill Period phase is executed at block 202. If SHIFT PHASE is in First Ramp at block 204, the First Ramp routine is run at block 206. If SHIFT PHASE equals CLOSED-LOOP at block 208, the Closed-Loop phase is executed at block 209. If SHIFT PHASE equals SECOND RAMP at block 210, the Second Ramp phase is executed at block 211. If SHIFT PHASE is none of these, the maximum pressure is commanded at block 212.

Figure 7:
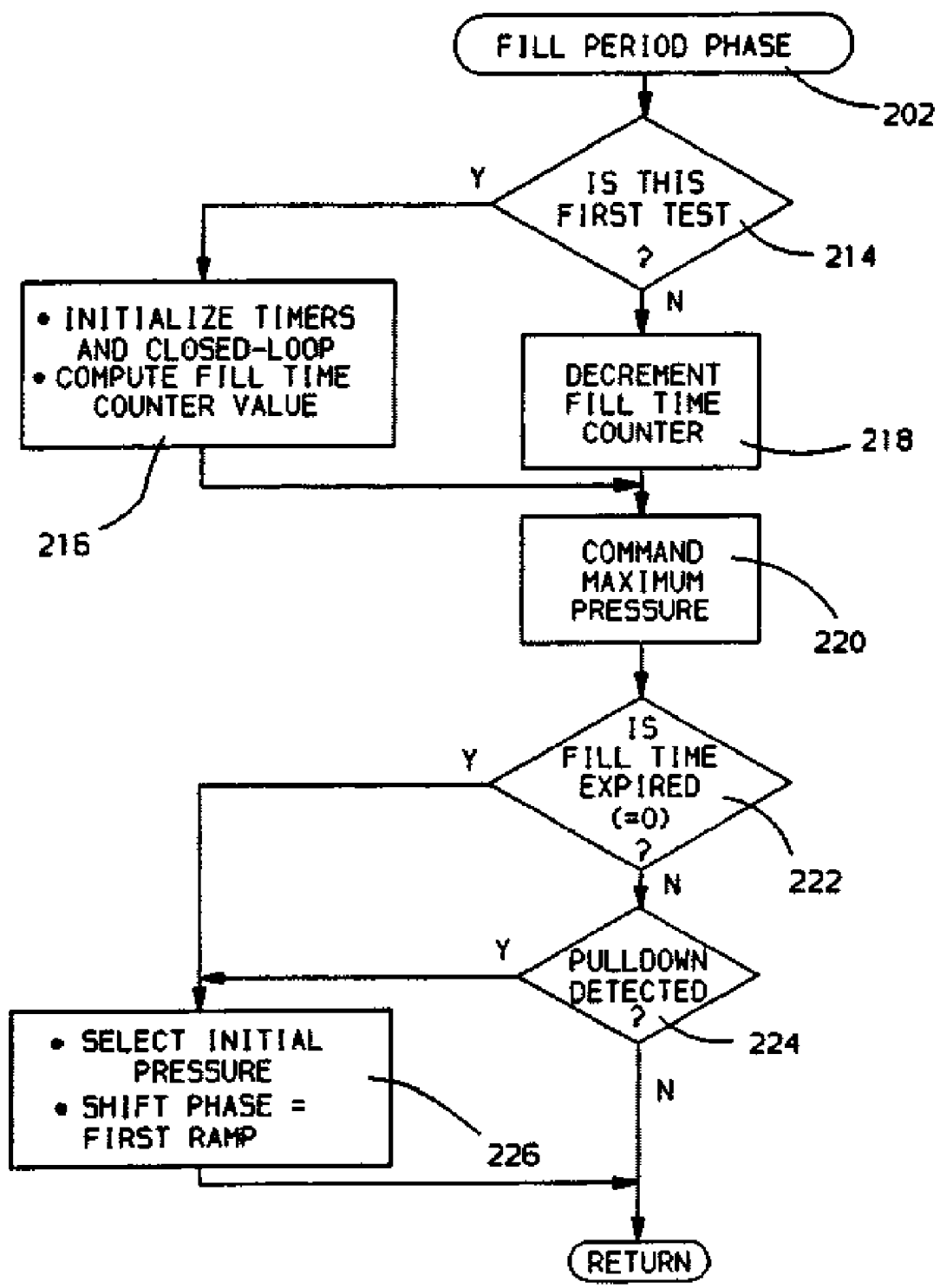

FIG. 7 illustrates the Fill Period phase logic 202. If it is the first time through the loop, determined at block 214, timers and closed-loop parameters are initialized and a FILL TIME counter value is computed at block 216. If it is not the first time through the loop, the FILL TIME counter is decremented at block 218. Next, the maximum pressure is commanded at block 220 and the routine returns to the main program. However, if the FILL TIME counter has decremented to zero, as determined at block 222, or pull-down is detected, as determined at block 224, initial pressure is selected and the SHIFT PHASE is set to FIRST RAMP at block 226.

Figure 8:
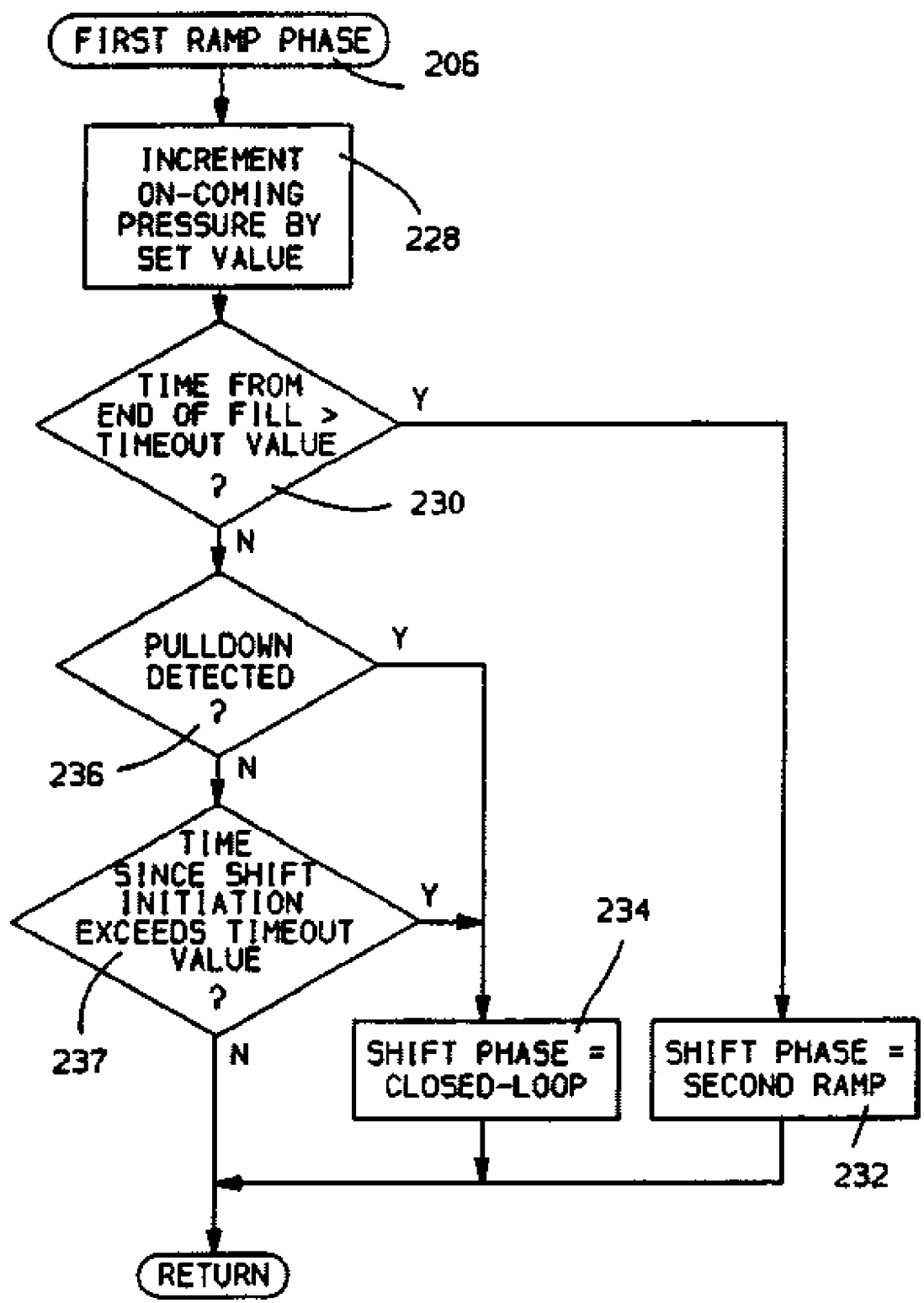

In the First Ramp phase (block 206), shown in FIG. 8, the on-coming pressure is incremented by a set value at block 228, and if the time from the end of fill is greater than a timeout value, determined at block 230, SHIFT PHASE is set to SECOND RAMP at block 232. If not, SHIFT PHASE is set to CLOSED-LOOP at block 234 if pull-down is detected, determined at block 236, or the time since shift initiation exceeds a timeout value, determined at block 237. Otherwise the program continues to the main loop.

Figure 9:
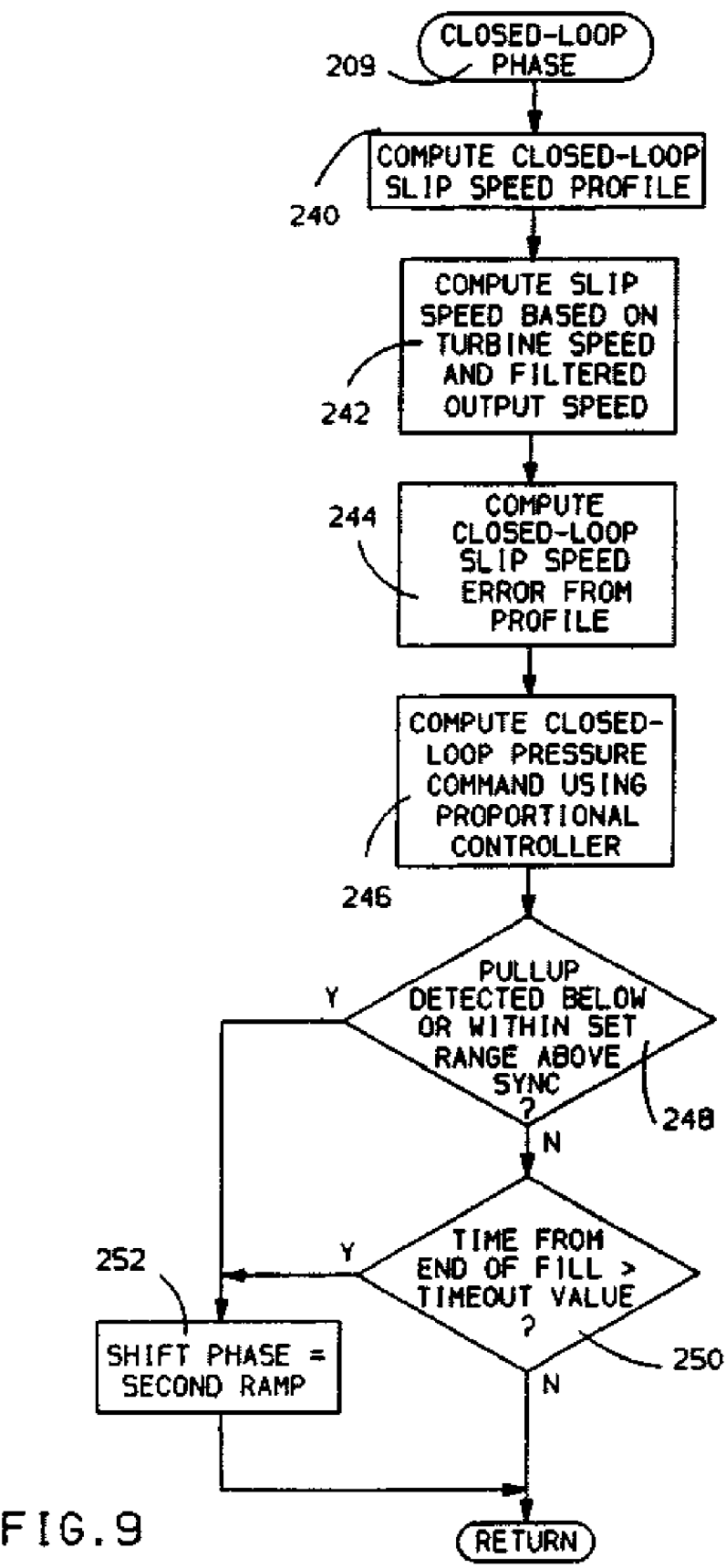

FIG. 9 illustrates the Closed-Loop phase (block 209), wherein the closed-loop slip speed profile is calculated at block 240, the slip speed is computed based on turbine speed, filtered output speed, and the target speed ratio at block 242, the slip speed error is calculated at block 244, and the closed-loop pressure command is computed using a proportional controller at block 246. If pull-up is detected (i.e. time t4 of FIG. 4) below or within a set range above sync, determined at block 248, or if the time from the end of fill is greater than a timeout value, determined at block 250, SHIFT PHASE is set to SECOND RAMP at block 252. The Second Ramp routine (not shown) increments the on-coming pressure by a set ramp value and then sets SHIFT PHASE to END if a set number of consecutive target range syncs are detected or if the maximum pressure command has been reached.

Figure 10:
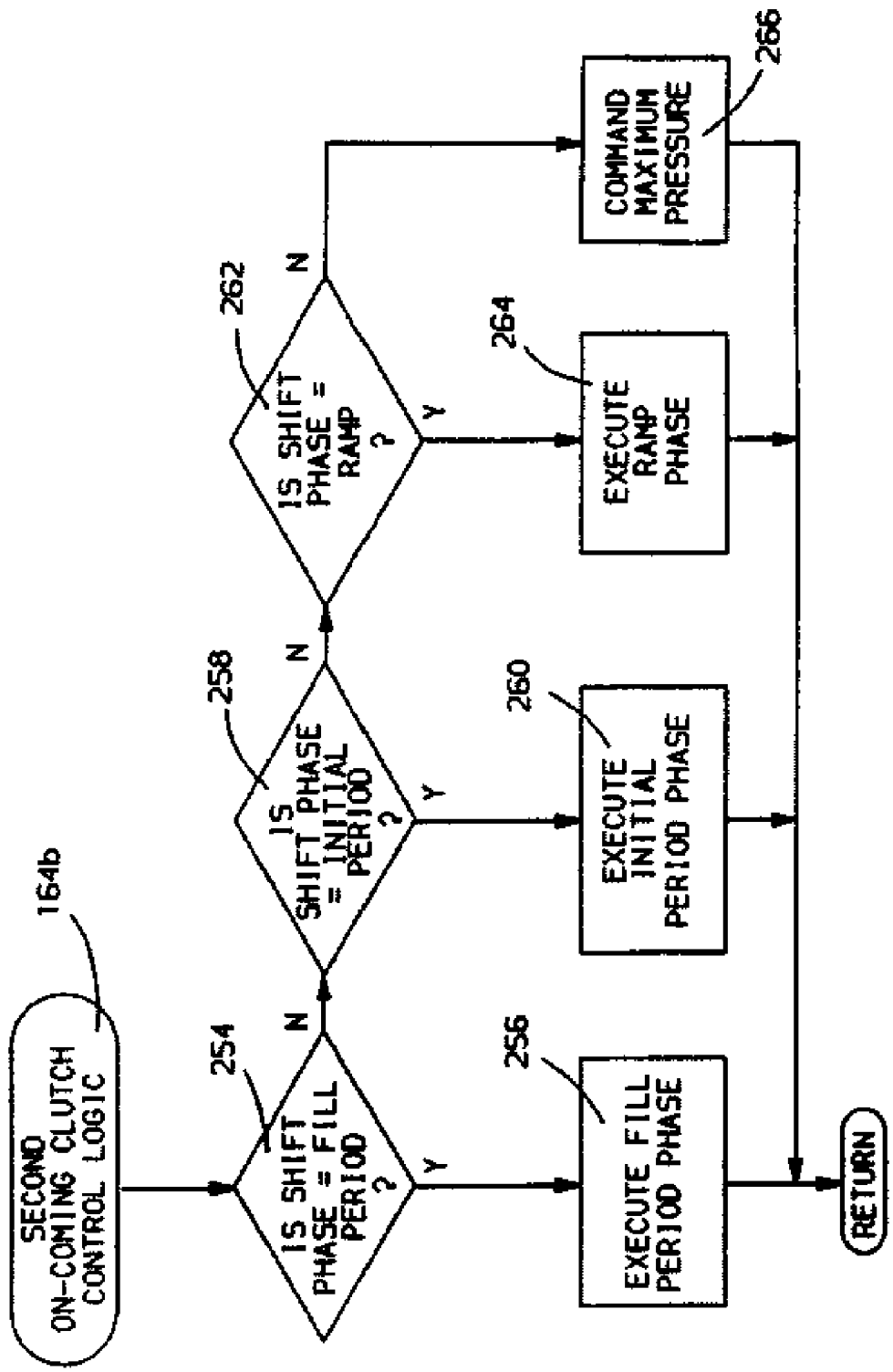
FIGS. 10 and 11 are flow diagrams for the second on-coming clutch control logic, in accordance with the present invention.

The second on-coming clutch control logic diagram, designated 164b, is shown in FIG. 10. If SHIFT PHASE is equal to Fill Period, determined at block 254, the Fill period phase is executed at block 256. If SHIFT PHASE equals INITIAL PERIOD, determined at block 258, the initial period phase is executed at block 260. If SHIFT PHASE is set to RAMP, determined at block 262, the Ramp phase is executed at block 264. If SHIFT PHASE equals none of these, the maximum pressure is commanded at block 266.

Figure 11:
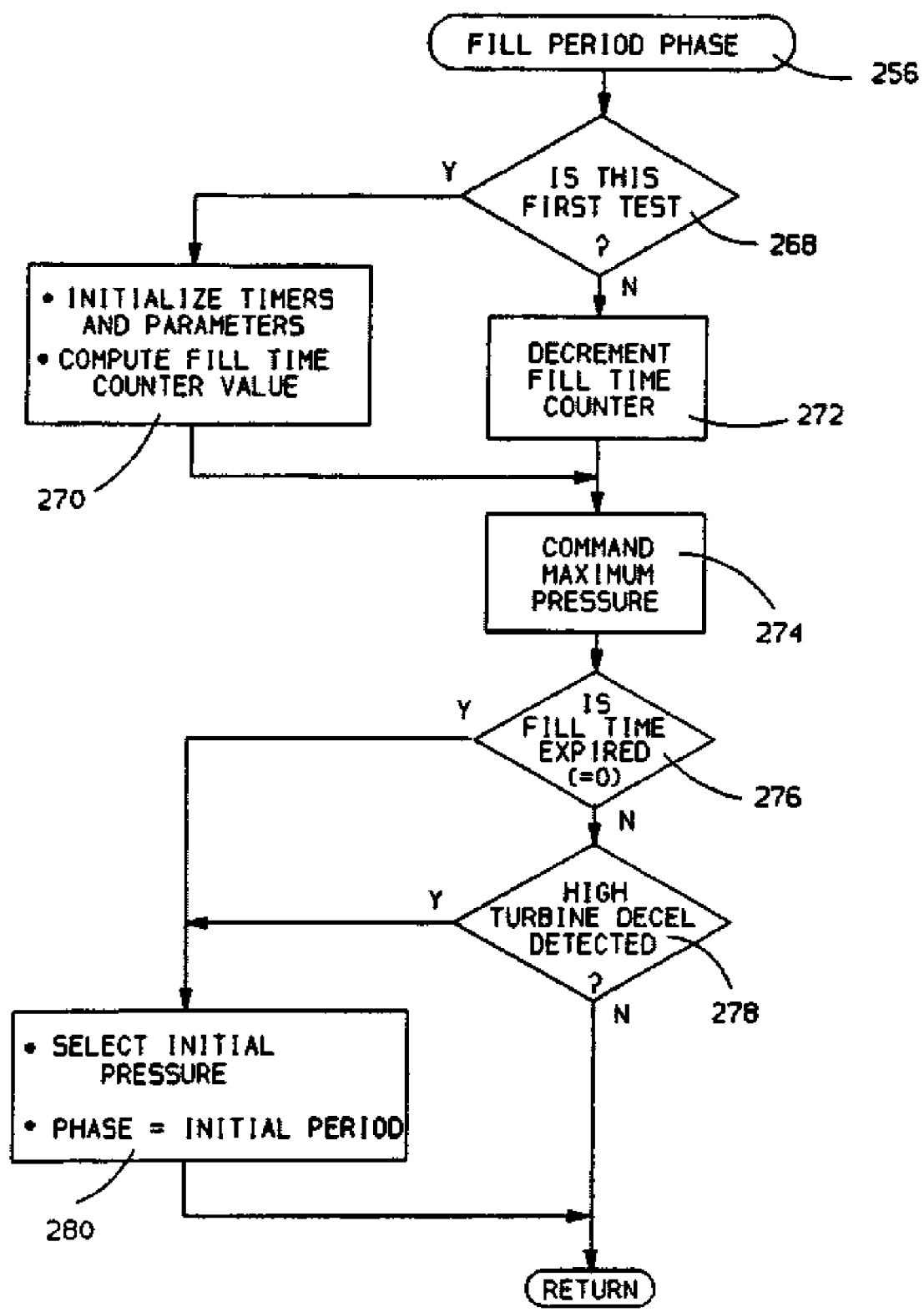

In the Fill Period phase (block 256), as shown in FIG. 11, if it is the first time through the loop, determined at block 268, timers and parameters are initialized and the FILL TIME counter value is computed at block 270. If it is not the first time through the loop, the FILL TIME counter is decremented at block 272. Next, the maximum pressure is commanded at block 274 and the routine returns to the main program. However, if the fill time counter has decremented to zero, determined at block 276, or a high turbine deceleration is detected, determined at block 278, initial pressure is selected and SHIFT PHASE is set to INITIAL PERIOD at block 280. The deceleration test assures that if the clutch fills enough to assume torque capacity and begins to affect turbine speed, the pressure will be reduced to a standby level or initial pressure. The Initial Period phase (not shown) holds the pressure at the selected value until pull-up is detected below sync or within a set value above sync (i.e. at time t4 of FIG. 4); then a clutch pressure value, Prmp3, for the second on-coming clutch is commanded and SHIFT PHASE is set to RAMP. The Ramp phase (not shown) increments the on-coining pressure command by a set value in each control loop. If a set number of consecutive syncs is detected (i.e. at time t5 of FIG. 4), or if the maximum pressure is reached, SHIFT PHASE is set to END to complete the shift by commanding maximum pressure at block 266.

Figure 12:
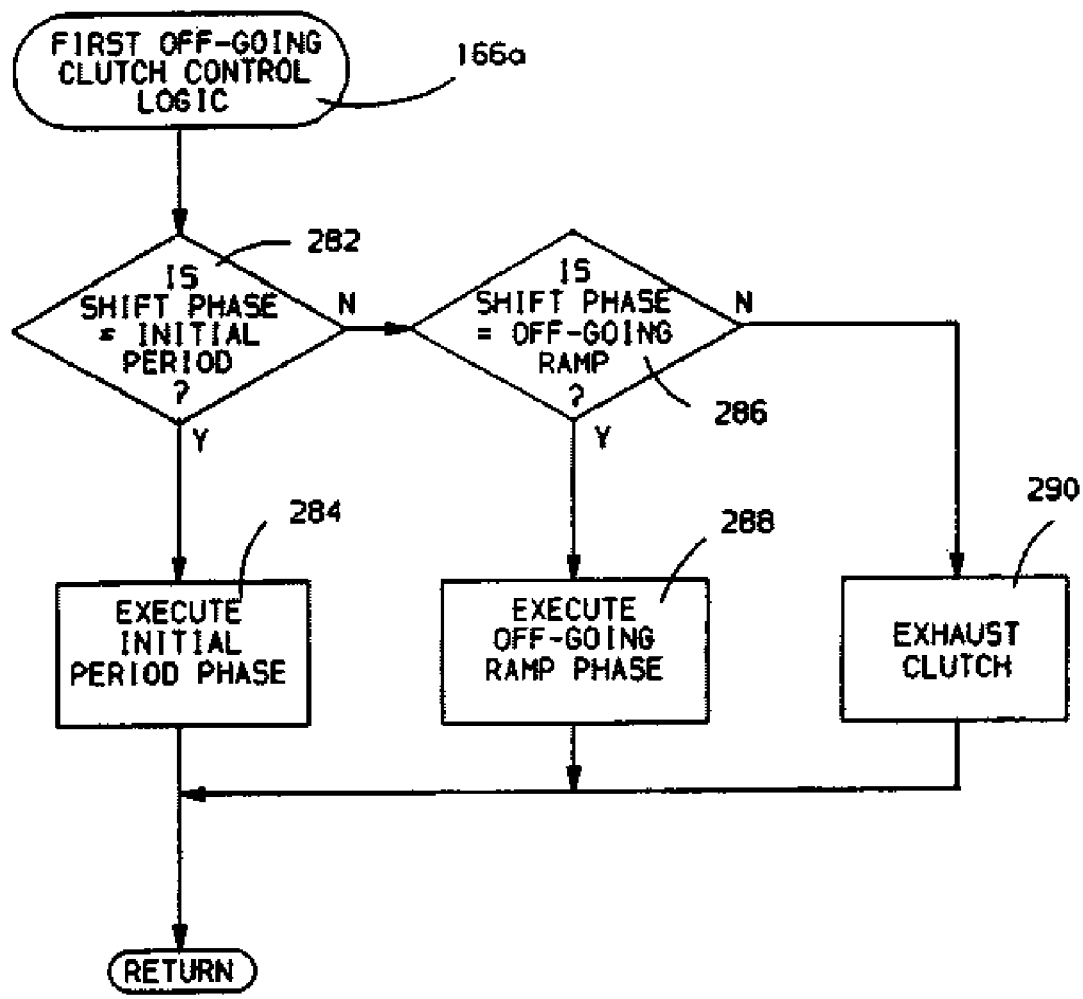
FIGS. 12 and 13 are flow diagrams for the first off-going clutch control logic, in accordance with the present invention.
Figure 14:
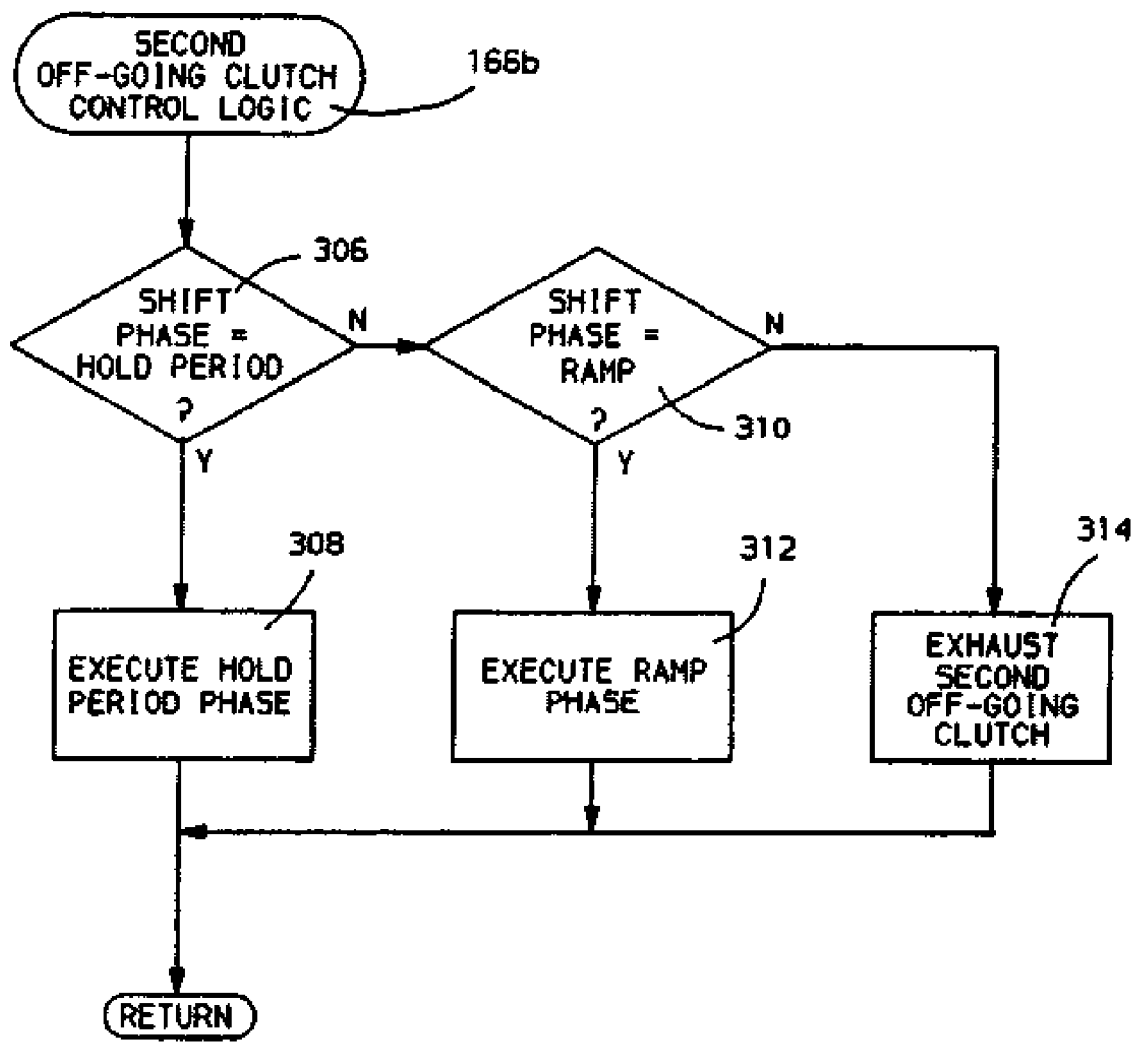
FIGS. 14 and 15 are flow diagrams for the second off-going clutch control logic, in accordance with the present invention.
Figure 15:
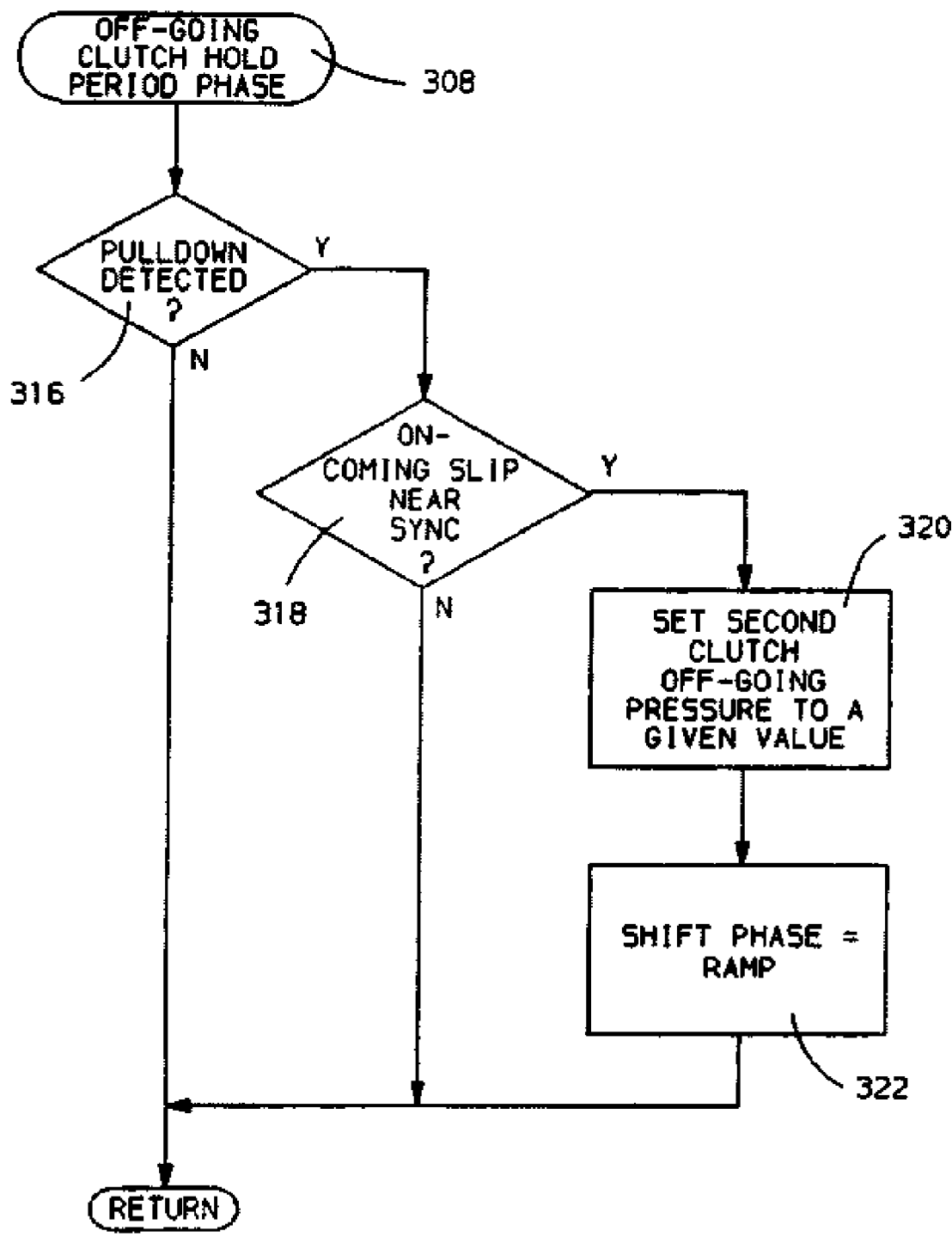

The off-going clutch control (block 166) of FIG. 3 includes the first off-going clutch control logic, designated 166a in FIG. 12, and second off-going clutch control logic, designated 166b in FIG. 14. The logic diagram for the first off-going clutch C6 is shown in FIG. 12. If SHIFT PHASE equals INITIAL PERIOD, determined at block 282, the Initial Period phase is executed at block 284. If SHIFT PHASE is set to OFF-GOING RAMP, determined at block 286, the Off-going Ramp routine is executed at block 288. Otherwise, the clutch is exhausted at block 290.

Figure 13:
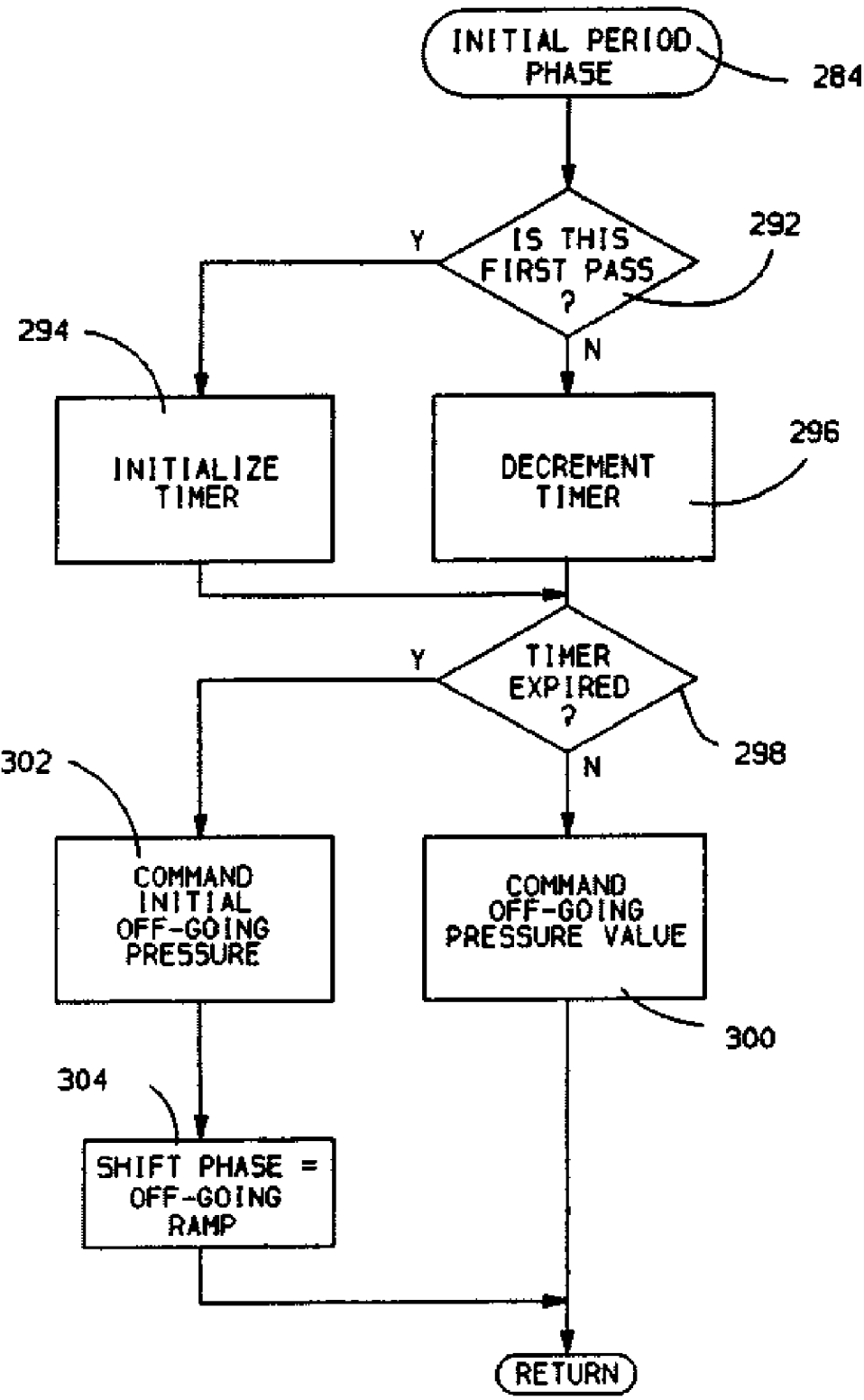

The initial period phase (block 284) is illustrated in FIG. 13. At block 292 it is determined whether it is the first pass through the loop, and if so, a timer is initialized at block 294, otherwise the timer is decremented at block 296. If the timer has not expired, as determined at block 298, an intermediate pressure value Pint is commanded at block 300. This corresponds to time t1 of FIG. 4. If the timer has expired, an initial off-going pressure Prmp1 is commanded at block 302, and SHIFT PHASE is set to OFF-GOING RAMP at block 304. In the Off-going Ramp phase (not shown), the pressure is decremented a set amount in each control loop until the SHIFT PHASE for the first on-coming clutch logic is set to CLOSED-LOOP (i.e. time t2 of FIG. 4), whereupon SHIFT PHASE for the first off-going clutch logic is set to END to cause the clutch C6 pressure to exhaust at block 290.

FIG. 14 illustrates the second off-going clutch control diagram 166b. If SHIFT PHASE equals HOLD PERIOD, as determined at block 306, the Hold Period phase is executed at block 308. If SHIFT PHASE equals RAMP, as determined at block 310, the Ramp routine is executed at block 312. Otherwise, the second off-going clutch is exhausted at block 314. As illustrated in the Hold Period phase routine of FIG. 15, the pressure of clutch C3 is initially unaffected. When pull-down is detected, as determined at block 316, and the on-coming slip is near sync (i.e. time t3 of FIG. 4), as determined at block 318, the second off-going clutch pressure command is set to a given value Prmp2 to begin a ramp down at block 320 and SHIFT PHASE is set to RAMP at block 322. In the Ramp phase (not shown), the second off-going pressure command is decremented in each control loop until the pressure command equals zero or a timeout limit is exceeded and then SHIFT PHASE is set to END to exhaust the clutch C3 at block 314 of FIG. 14.

FIG. 16 illustrates a method of detecting and preventing tie-up during the double transition up-shift illustrated in FIG. 4 Graphs A, B, C, D, and E. As described hereinabove, tie-up occurs when the second off-going clutch fails to disengage, while the second oncoming clutch gains capacity. Should this occur, tie-up within the transmission 16 of FIG. 1a is possible and an undesirable braking action may occur. As described earlier the double transition up-shift is accomplished by shifting from an initial speed ration, i.e. low forward range, to a final speed ratio, i.e. first forward range, through an intermediate speed ratio, i.e. third forward range.

The control strategy of the present invention is to monitor the state of engagement of the second off-going clutch by determining if the intermediate speed ratio, i.e. the third forward speed ratio, has been achieved, as determined at block 324. If the transmission 16 is operating in the intermediate speed ratio, and a transition from the intermediate speed ratio to a final speed ratio is commanded, a determination is made as to whether the transmission 16 has been operating in the intermediate speed ratio for greater than a predetermined calibrated time value and whether engine load, such as % T, is greater than a predetermined calibrated load value. These determinations are made at block 326, and if so, the transmission 16 will be forced to operate in the intermediate speed ratio at block 328. Additionally, at block 328 the second oncoming clutch, i.e. C5 will exhaust, thereby eliminating the possibility of tie-up and aborting the shift from the intermediate speed ration to the final speed ratio. At block 330 a diagnostic fault code is set to active indicating that the second off-going clutch failed to disengage during the double transition up-shift and that corrective action must be taken. Those skilled in the art will recognize that a multitude of engine and transmission combinations are possible, therefore, the calibrated time and load values should be chosen fore each vehicle type.

While the best modes for carrying out the invention have been described in detail, those familiar with the art to which this invention relates will recognize various alternative designs and embodiments for practicing the invention within the scope of the appended claims.

The invention claimed is:

1. A method of detecting and preventing tie-up during a double transition shift of an automatically shiftable transmission operatively connected with an engine, wherein the double transition shift includes shifting from an initial speed ratio to a final speed ratio through an intermediate speed ratio, the method comprising:

shifting the automatically shiftable transmission from the initial speed ratio to the intermediate speed ratio;

commanding the automatically shiftable transmission to shift from the intermediate speed ratio to the final speed ratio;

determining if the automatically shiftable transmission has been operating in the intermediate speed ratio for greater than a predetermined amount of time after commanding the automatically shiftable transmission to shift from the intermediate speed ratio to the final speed ratio;

preventing shifting from the intermediate speed ratio to the final speed ratio to avoid tie-up if it is determined that the automatically shiftable transmission has been operating in the intermediate speed ratio for greater than the predetermined amount of time; and wherein the intermediate speed ratio is lower than the final speed ratio and wherein the final speed ratio is lower than the initial speed ratio.

2. The method of claim 1, further comprising continuing to operate the automatically shiftable transmission in the intermediate speed ratio if it is determined that the automatically shiftable transmission has been operating in the intermediate speed ratio for greater than said predetermined amount of time.

3. The method of claim 1, further comprising determining if engine load is greater than a predetermined value and preventing shifting from the intermediate speed ratio to the final speed ratio to avoid tie-up if the engine load is greater than said predetermined value.

4. The method of claim 1, further comprising setting a fault code to active if it is determined that the automatically shiftable transmission has been operating in the intermediate speed ratio for greater than said predetermined amount of time.

5. The method of claim 3, further comprising setting a fault code to active if it is determined that the engine load is greater than said predetermined value.

6. The method of claim 1, wherein shifting the automatically shiftable transmission from the initial speed ratio to the intermediate speed ratio includes:
- disengaging a first selectively engageable off-going torque transmitting mechanism; and
- subsequently engaging a first selectively engageable on-coming torque transmitting mechanism.

7. The method of claim 1, wherein commanding the automatically shiftable transmission to shift from the intermediate speed ratio to the final speed ratio includes:
- commanding disengagement of a second selectively engageable off-going torque transmitting mechanism; and
- subsequently commanding engagement of a second selectively engageable on-coming torque transmitting mechanism.

8. The method of claim 1, wherein preventing shifting from the intermediate speed ratio to the final speed ratio to avoid tie-up includes:
- preventing engagement of a second selectively engageable on-coming torque transmitting mechanism; and
- maintaining engagement of a second selectively engageable off-going torque transmitting mechanism.

9. A method of detecting and preventing tie-up during a double transition shift of an automatically shiftable transmission having an input shaft operatively connected with an engine and an output shaft, the method comprising:
- shifting from an initial speed ratio to an intermediate speed ratio by disengaging a first selectively engageable off-going torque transmitting mechanism and subsequently engaging a first selectively engageable on-coming torque transmitting mechanism;
- commanding the automatically shiftable transmission to shift from said intermediate speed ratio to a final speed ratio by commanding disengagement of a second selectively engageable off-going torque transmitting mechanism and subsequently commanding engagement of a second selectively engageable on-coming torque transmitting mechanism;
- determining if the automatically shiftable transmission has been operating in said intermediate speed ratio for greater than a predetermined amount of time prior to commanding engagement of said second selectively engageable on-coming torque transmitting mechanism;
- preventing shifting from said intermediate speed ratio to said final speed ratio to avoid tie-up by preventing engagement of said second selectively engageable on-coming torque transmitting mechanism if it is determined that the automatically shiftable transmission has been operating in said intermediate speed ratio for greater than said predetermined amount of time; and
- wherein said intermediate speed ratio is lower than said final speed ratio and wherein said final speed ratio is lower than said initial speed ratio.

10. The method of claim 9, further comprising continuing to operate the automatically shiftable transmission in said intermediate speed ratio if it is determined that the automatically shiftable transmission has been operating in said intermediate speed ratio for greater than said predetermined amount of time.

11. The method of claim 9, further comprising determining if engine load is greater than a predetermined value and preventing shifting from said intermediate speed ratio to said final speed ratio to avoid tie-up if said engine load is greater than said predetermined value.

12. The method of claim 9, further comprising setting a fault code to active if it is determined that the automatically shiftable transmission has been operating in said intermediate speed ratio for greater than said predetermined amount of time.

13. The method of claim 11, further comprising setting a fault code to active if it is determined that said engine load is greater than said predetermined value.

14. The method of claim 11, further comprising:
- determining whether a relative speed of the input shaft to the output shaft has obtained a predetermined relationship prior to commanding the automatically shiftable transmission to shift from said intermediate speed ratio to said final speed ratio; and
- commanding the automatically shiftable transmission to shift from said intermediate speed ratio to said final speed ratio if said relative speed of the input shaft to the output shaft has obtained said predetermined relationship.

15. A method of detecting and preventing tie-up during a double transition shift of an automatically shiftable transmission having an input shaft operatively connected with an engine and an output shaft, the method comprising:
- shifting from an initial speed ratio to an intermediate speed ratio by disengaging a first selectively engageable off-going torque transmitting mechanism and subsequently engaging a first selectively engageable on-coming torque transmitting mechanism;
- determining whether a relative speed of the input shaft to the output shaft has obtained a predetermined relationship;
- commanding the automatically shiftable transmission to shift from said intermediate speed ratio to a final speed ratio by commanding disengagement of a second selectively engageable off-going torque transmitting mechanism and subsequently commanding engagement of a second selectively engageable on-coming torque transmitting mechanism if said relative speed of the input shaft to the output shaft has obtained said predetermined relationship;
- determining if the automatically shiftable transmission has been operating in said intermediate speed ratio for greater than a predetermined amount of time and if engine load is greater than a predetermined value prior to commanding engagement of said second selectively engageable on-coming torque transmitting mechanism;
- preventing shifting from said intermediate speed ratio to said final speed ratio to avoid tie-up by preventing engagement of said second selectively engageable on-coming torque transmitting mechanism if it is determined that the automatically shiftable transmission has been operating in said intermediate speed ratio for greater than said predetermined amount of time and said engine load is greater than said predetermined value; and
- wherein said intermediate speed ratio is lower than said final speed ratio and wherein said final speed ratio is lower than said initial speed ratio.

16. The method of claim 15, further comprising continuing to operate the automatically shiftable transmission in said intermediate speed ratio if it is determined that the automatically shiftable transmission has been operating in said intermediate speed ratio for greater than said predetermined amount of time.

17. The method of claim 15, further comprising setting a fault code to active if it is determined that the automatically shiftable transmission has been operating in said intermediate speed ratio for greater than said predetermined amount of time and said engine load is greater than said predetermined value.

* * * * *